United States Patent
Yamaguchi et al.

(10) Patent No.: US 10,442,896 B2
(45) Date of Patent: Oct. 15, 2019

(54) ROOM TEMPERATURE-CURABLE ORGANOPOLYSILOXANE COMPOSITION AND CURED PRODUCT THEREOF

(71) Applicant: SHIN-ETSU CHEMICAL CO., LTD., Tokyo (JP)

(72) Inventors: Takahiro Yamaguchi, Annaka (JP); Takafumi Sakamoto, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 114 days.

(21) Appl. No.: 15/563,818

(22) PCT Filed: Jan. 21, 2016

(86) PCT No.: PCT/JP2016/051706
§ 371 (c)(1),
(2) Date: Oct. 2, 2017

(87) PCT Pub. No.: WO2016/157948
PCT Pub. Date: Oct. 6, 2016

(65) Prior Publication Data
US 2018/0079867 A1    Mar. 22, 2018

(30) Foreign Application Priority Data
Apr. 3, 2015 (JP) .................................. 2015-076874

(51) Int. Cl.
| C08G 77/20 | (2006.01) |
| C09D 183/06 | (2006.01) |
| C08K 5/5425 | (2006.01) |
| C09J 183/06 | (2006.01) |
| C09K 3/10 | (2006.01) |
| C08L 83/06 | (2006.01) |
| C08G 77/16 | (2006.01) |
| C08G 77/26 | (2006.01) |

(52) U.S. Cl.
CPC ............. *C08G 77/20* (2013.01); *C08G 77/16* (2013.01); *C08G 77/26* (2013.01); *C08K 5/5425* (2013.01); *C08L 83/06* (2013.01); *C09D 183/06* (2013.01); *C09J 183/06* (2013.01); *C09K 3/10* (2013.01); *C08L 2205/02* (2013.01)

(58) Field of Classification Search
CPC .................................................... C08G 77/20
See application file for complete search history.

(56) References Cited

U.S. PATENT DOCUMENTS

| 3,294,739 A | 12/1966 | Weyenberg |
| 4,111,890 A | 9/1978 | Getson et al. |
| 2014/0314985 A1 | 10/2014 | Rathore et al. |

| 2015/0315428 A1 | 11/2015 | Sakamoto et al. |
| 2015/0315438 A1 | 11/2015 | Sakamoto et al. |
| 2017/0130031 A1 | 5/2017 | Yamaguchi et al. |

FOREIGN PATENT DOCUMENTS

| EP | 3 085 739 A1 | 10/2016 |
| JP | 39-27643 | 12/1964 |
| JP | 54-88224 A | 7/1979 |
| JP | 54-88225 A | 7/1979 |
| JP | 55-43119 A | 3/1980 |
| JP | 4-283589 A | 10/1992 |
| JP | 7-39547 B2 | 5/1995 |

(Continued)

OTHER PUBLICATIONS

Notification of Reasons for Refusal dated Dec. 4, 2018, in Japanese Patent Application No. 2017-509317, with English translation.

(Continued)

*Primary Examiner* — Arrie L Reuther
(74) *Attorney, Agent, or Firm* — Birch, Stewart, Kolasch & Birch, LLP

(57) ABSTRACT

Provided is a room temperature-curable organopolysiloxane composition that is superior in fast curably, can form a cured product superior in storage stability and durability, and can further be produced in an industrially advantageous manner using more highly versatile materials.

The room temperature-curable organopolysiloxane composition contains:

(A) an organopolysiloxane represented by the following general formula (1)

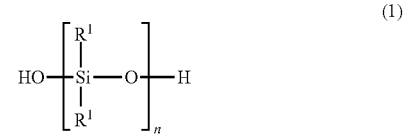

wherein $R^1$ represents a hydrogen atom or a monovalent hydrocarbon group, and n represents an integer of not smaller than 1;

(B) a hydrolyzable organic silicon compound and/or a partial hydrolysis condensate thereof represented by the following general formula (2)

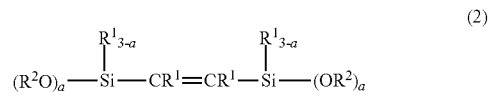

wherein $R^1$ represents a hydrogen atom or a monovalent hydrocarbon group, $R^2$ represents an alkyl group or a cycloalkyl group, and a represents an integer of 1 to 3; and (C) a curing catalyst.

6 Claims, No Drawings

(56) References Cited

FOREIGN PATENT DOCUMENTS

| | | |
|---|---|---|
| JP | 7-331076 A | 12/1995 |
| WO | WO 2014/097573 A1 | 6/2014 |
| WO | WO 2014/097574 A1 | 6/2014 |
| WO | WO 2015/048824 A2 | 4/2015 |
| WO | WO 2015/093139 A1 | 6/2015 |
| WO | WO 2015/194340 A1 | 12/2015 |
| WO | WO 2016/011071 A2 | 1/2016 |

OTHER PUBLICATIONS

Extended European Search Report dated Oct. 16, 2018, in European Patent Application No. 16771834.5.
International Search Report, issued in PCT/JP2016/051706, dated Apr. 19, 2016.
Written Opinion of the International Searching Authority, issued in PCT/JP2016/051706, dated Apr. 19, 2016.

ROOM TEMPERATURE-CURABLE ORGANOPOLYSILOXANE COMPOSITION AND CURED PRODUCT THEREOF

TECHNICAL FIELD

The present invention relates to a room temperature-curable organopolysiloxane composition and an elastomer-shaped molded product (silicone rubber cured product) obtained by curing such room temperature-curable organopolysiloxane composition. Particularly, the present invention relates to: a room temperature-curable organopolysiloxane composition containing, as a curing agent (cross-linking agent), a bissilyl-type hydrolyzable organic silicon compound having two hydrolyzable silyl groups in its molecule and a structure where two silicon atoms in such hydrolyzable silyl groups are bonded to each other through a carbon-carbon double bond and/or a partial hydrolysis condensate thereof (hydrolyzable siloxane oligomer); and to an elastomer-shaped molded product (silicone rubber cured product) obtained by curing this room temperature-curable organopolysiloxane composition.

BACKGROUND ART

Conventionally, there have been known various types of room temperature-curable organopolysiloxane compositions capable of being cured into elastomer (silicone rubber) shaped products at room temperature (25° C.±10° C.) through a cross-linking reaction due to a condensation reaction, when coming into contact with water in the air. Among these compositions, those of dealcoholization-type are cured by releasing alcohols through a condensation reaction at the time of cross-linking; and are preferably used as sealing, adhesive and coating materials for electric and electronic devices or the like, since they characteristically do not produce unpleasant odors, nor do they corrode metals.

Typical examples of a composition of the above type include a composition comprised of a hydroxyl-endblocked polyorganosiloxane, alkoxysilane and an organic titanium compound; a composition comprised of an alkoxysilyl-endblocked polyorganosiloxane, alkoxysilane and alkoxy titanium; a composition comprised of a linear polyorganosiloxane whose silethylene group-containing alkoxysilyl end is blocked, alkoxysilane and alkoxy titanium; and a composition comprised of a hydroxyl-endblocked or alkoxy-endblocked polyorganosiloxane and an alkoxy-α-silylester compound (Patent documents 1 to 4).

Although these compositions exhibit certain levels of storage stability, water resistance and moisture resistance, a perfectly satisfactory level has not yet been reached. Moreover, an insufficient fast curability has been observed with these compositions.

As mentioned above, an organosiloxane polymer having a reactive (hydrolyzable) alkoxysilyl group(s) at its terminal(s) is conventionally known. This polymer has its polymer end group already blocked by an alkoxysilyl group, thus exhibiting an insignificant change (decrease) in curability with time and a superior storage stability. Further, a workability (e.g. viscosity, thixotropy) of such polymer can be arbitrarily adjusted, and superior properties (e.g. hardness, tensile strength and elongation at break) have also been observed with such polymer as it forms an elastomer through a cross-linking reaction by reaction with water in the air.

However, those of dealcoholization-type have exhibited an insufficient curability due to their low reactivity with water in the air, as compared to curable organopolysiloxane compositions of other known curing types such as those of deoximation type, de-acetic acid type and deacetone type.

The inventors of the present invention have proposed a polymer having an alkoxysilyl-vinylene group (alkoxysilyl-ethenylene group) at its terminal and a composition comprised of such polymer, for the purpose of developing a room temperature-curable organopolysiloxane composition capable of forming a cured product through a superior fast curability, and having a superior moisture resistance (i.e. curability exhibited after stored under a moisture condition) (Patent documents 5 and 6). Although these polymer and composition have excellent properties, there have to be newly synthesized polymers with various molecular weights and substituent structures, thus making it difficult to produce such polymer and composition in an industrially advantageous manner.

PRIOR ART DOCUMENT

Patent Document

Patent document 1 Japanese Examined Patent Publication No. Sho 39-27643
Patent document 2 Japanese Unexamined Patent Application Publication No. Sho 55-43119
Patent document 3 Japanese Examined Patent Publication No. Hei 7-39547
Patent document 4 Japanese Unexamined Patent Application Publication No. Hei 7-331076
Patent document 5 WO 2014/097573
Patent document 6 WO 2014/097574

SUMMARY OF THE INVENTION

Problem to be Solved by the Invention

The present invention was made in view of the aforementioned circumstances. It is an object of the invention to provide a room temperature-curable organopolysiloxane composition, particularly a room temperature-curable organopolysiloxane composition of dealcoholization-type that is especially superior in fast curably, can form a cured product superior in storage stability and durability, and can further be produced in an industrially advantageous manner using more highly versatile materials.

Means to Solve the Problem

The inventors of the present invention diligently conducted a series of studies to achieve the abovementioned objectives, and completed the invention as follows. That is, the inventors found that the hydrolyzability of the alkoxy groups in an alkoxysilyl group would be dramatically improved only when a linking group adjacent to such alkoxysilyl group was a vinylene group (ethenylene group). Specifically, the inventors found that there could be obtained a room temperature-curable organopolysiloxane composition of dealcoholization-type that was especially superior in fast curably and could form a cured product with a favorable storage stability and durability, by using, as a cross-linking agent (curing agent), a hydrolyzable organic silicon compound such as a bissilyl-type organosilane having two hydrolyzable silyl groups in its molecule and a structure where two silicon atoms in such hydrolyzable silyl groups are bonded to each other through a carbon-carbon double bond (ethenylene group) and/or a partial hydrolysis condensate thereof (hydrolyzable siloxane oligomer), such hydrolyzable organic silicon compound and partial hydrolysis condensate thereof being represented by the following formula (2). Further, such room temperature-curable organopolysiloxane composition can be produced in an industrially advantageous manner, by using highly versatile materials (e.g. vinylsilane) as starting materials to prepare the alkoxysilyl-vinylene group (alkoxysilyl-ethenylene)-containing group.

That is, the present invention is to provide the following room temperature-curable organopolysiloxane composition; a molded product as a cured product of such composition; and, for example, a sealing agent, coating agent or adhesive agent containing such composition.

[1]

A room temperature-curable organopolysiloxane composition comprising:

(A) 100 parts by mass of an organopolysiloxane represented by the following general formula (1)

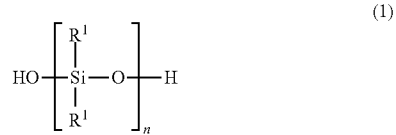

wherein $R^1$ represents either a hydrogen atom or a monovalent hydrocarbon group that has 1 to 20 carbon atoms and may have a substituent group(s), the multiple $R$'s are identical to or different from one another, and n represents an integer of not smaller than 1;

(B) a hydrolyzable organic silicon compound and/or a partial hydrolysis condensate thereof that are or is in an amount of 0.1 to 30 parts by mass per 100 parts by mass of the component (A), and represented by the following general formula (2)

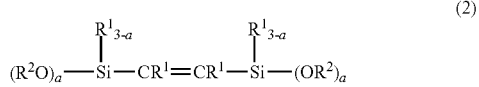

wherein $R^1$ represents either a hydrogen atom or a monovalent hydrocarbon group that has 1 to 20 carbon atoms and may have a substituent group(s), the multiple $R^1$s are identical to or different from one another, $R^2$ represents either an alkyl group that has 1 to 20 carbon atoms and may have a substituent group(s) or a cycloalkyl group that has 3 to 20 carbon atoms, and a represents an integer of 1 to 3; and (C) a curing catalyst in an amount of 0.001 to 20 parts by mass per 100 parts by mass of the component (A).

[2]

The room temperature-curable organopolysiloxane composition according to [1], further comprising:

(D) a hydrolyzable organosilane and/or a partial hydrolysis condensate thereof other than the components (A) and (B), in an amount of 0 to 30 parts by mass per 100 parts by mass of the component (A);

(E) a filler in an amount of 0.1 to 1,000 parts by mass per 100 parts by mass of the component (A); and (F) an adhesion promoter in an amount of 0.001 to 30 parts by mass per 100 parts by mass of the component (A).

[3]

The room temperature-curable organopolysiloxane composition according to [1] or [2], further comprising:

(G) an organopolysiloxane that is in an amount of 0.01 to 100 parts by mass per 100 parts by mass of the component (A), and is represented by the following general formula (3)

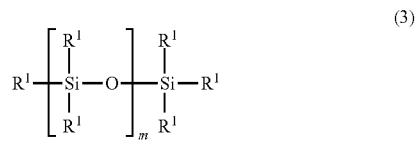

wherein $R^1$ represents either a hydrogen atom or a monovalent hydrocarbon group that has 1 to 20 carbon atoms and may have a substituent group(s), the multiple $R^1$s are identical to or different from one another, and m represents an integer of 1 to 2,000.

[4]

A sealing agent, coating agent or adhesive agent containing the room temperature-curable organopolysiloxane composition as set forth in any one of [1] to [3].

[5]

A molded product comprised of a cured product of the room temperature-curable organopolysiloxane composition as set forth in any one of [1] to [3].

Effect of the Invention

The room temperature-curable organopolysiloxane composition of the invention is especially superior in fast curability in the air at room temperature. Moreover, even after being stored for six months, for example, the composition of the invention can still be rapidly cured when exposed to the air, and exhibit excellent properties. Therefore, the room temperature-curable organopolysiloxane composition of the invention is suitable for use in a sealing agent, a coating agent and an adhesive agent that are applied to parts for which heat resistance, water resistance and moisture resistance are required. Particularly, the composition of the invention can be effectively used for construction purposes and in adhesive agents for electric/electronic parts, where steam resistance and water resistance are required. Further, there can be obtained a cured product particularly formed through a superior curability and exhibiting a favorable storage stability and durability, by using, as a curing agent component (B), the hydrolyzable organic silicon compound such as the bissilyl-type organosilane having two hydrolyzable silyl groups in its molecule and the structure where the two silicon atoms in such hydrolyzable silyl groups are bonded to each other through the carbon-carbon double bond (ethenylene group) and/or the partial hydrolysis condensate thereof (hydrolyzable siloxane oligomer), such hydrolyzable organic silicon compound and partial hydrolysis condensate thereof being represented by the above general formula (2). Furthermore, vinylsilane (e.g. monovinyl alkoxysilane) which is a general-purpose product can be used as a starting material of the component (B), thereby allowing the room temperature-curable organopolysiloxane composition of the invention to be produced in an industrially advantageous manner.

MODE FOR CARRYING OUT THE INVENTION

The present invention is described in greater detail hereunder.

<Room Temperature-Curable Organopolysiloxane Composition>
—Component (A)—

A component (A) is a linear organopolysiloxane with both terminals of its molecular chain being blocked by a silicon atom-bonded hydroxyl group (i.e. silanol group or diorganohydroxysiloxy group), and is represented by the following general formula (1). The component (A) serves as a main agent (base polymer) of the composition of the invention.

[Chemical formula 4]

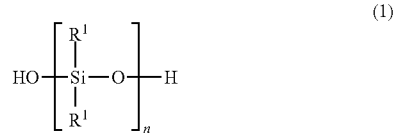

(1)

(In the formula (1), $R^1$ represents a hydrogen atom; or a monovalent hydrocarbon group that has 1 to 20 carbon atoms and may have a substituent group(s). The multiple $R^1$s may be identical to or different from one another. n represents an integer of not smaller than 1.)

In the above formula (1), the substituted or unsubstituted monovalent hydrocarbon group as represented by $R^1$ has about 1 to 20 carbon atoms, preferably about 1 to 10 carbon atoms, and more preferably about 1 to 8 carbon atoms. Such monovalent hydrocarbon groups as represented by $R^1$ may be identical to or different from one another. Specific examples of such monovalent hydrocarbon group include alkyl groups such as a methyl group, an ethyl group, an n-propyl group, an isopropyl group, an n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; cycloalkyl groups such as a cyclopentyl group and a cyclohexyl group; alkenyl groups such as a vinyl group, an allyl group, a propenyl group, an isopropenyl group, a butenyl group, a pentenyl group and a hexenyl group; aryl groups such as a phenyl group, a tolyl group, a xylyl group and an α-, β-naphthyl group; aralkyl groups such as a benzyl group, a 2-phenylethyl group and a 3-phenylpropyl group; or groups obtained by substituting a part of or all the hydrogen atoms in any of the abovementioned groups with, for example, cyano groups and/or halogen atoms such as F, Cl and Br, examples of such substituted groups including a 3-chloropropyl group, a 3,3,3-trifluoropropyl group and a 2-cyanoethyl group. Among the aforementioned groups, preferred are a methyl group, an ethyl group and a phenyl group; particularly preferred are a methyl group and a phenyl group in terms of availability, productivity and cost.

It is preferred that the organopolysiloxane as the component (A) exhibit a viscosity of about 10 to 1,000,000 mPa·s, more preferably about 50 to 500,000 mPa·s, even more preferably about 100 to 100,000 mPa·s, particularly preferably about 500 to 80,000 mPa·s, and most preferably about 1,000 to 50,000 mPa·s, at a temperature of 25° C. It is preferable when the viscosity of this organopolysiloxane is not lower than 10 mPa·s, and not higher than 1,000,000 mPa·s. Because when the viscosity is not lower than 10 mPa·s, there can be easily obtained a coating film having superior physical and mechanical strengths. And, when the viscosity is not higher than 1,000,000 mPa·s, the viscosity of the composition will not become extremely high such that a favorable workability can be achieved at the time of use. Here, the viscosity is a numerical value measured by a rotary viscometer (e.g. BL-type, BH-type, BS-type and cone platetype).

Here, in order for the organopolysiloxane as the component (A) to exhibit the above viscosity, it is desired that n (i.e. the number of the bifunctional diorganosiloxane units in the molecule or polymerization degree) in the general formula (1) be an integer that is normally in a range of about 10 to 2,000, preferably about 30 to 1,500, more preferably about 50 to 1,200, even more preferably about 100 to 1,000, and particular preferably about 200 to 800. Polymerization degree (or molecular weight) can, for example, be obtained as a number-average polymerization degree (or number-average molecular weight) in terms of polystyrene in a gel permeation chromatography (GPC) analysis using toluene or the like as a developing solvent. One or two or more kinds of the organopolysiloxane as the component (A) may be used in combination.

It is preferred that the organopolysiloxane as the component (A) be contained in the room temperature-curable organopolysiloxane composition of the invention by an amount of 25 to 98% by mass, particularly preferably 60 to 90% by mass.

—Component (B)—

A component (B) represented by the following general formula (2) comprises a hydrolyzable organic silicon compound such as a bissilyl-type organosilane having two hydrolyzable silyl groups in its molecule and a structure where two silicon atoms in such hydrolyzable silyl groups are bonded to each other through a carbon-carbon double bond (ethenylene group) and/or a partial hydrolysis condensate thereof (hydrolyzable siloxane oligomer). The component (B) serves as a curing agent (cross-linking agent) in the composition of the present invention, contributes to a fast curability of the composition, and allows a cured product obtained (silicone rubber) to exhibit a superior moisture resistance.

[Chemical formula 5]

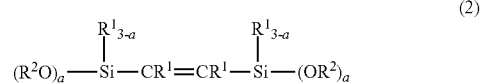

(2)

(In the formula (2), $R^1$ represents a hydrogen atom or a monovalent hydrocarbon group that has 1 to 20 carbon atoms and may have a substituent group(s). The multiple $R^1$s may be identical to or different from one another. $R^2$ represents an alkyl group that has 1 to 20 carbon atoms and may have a substituent group(s); or a cycloalkyl group that has 3 to 20 carbon atoms. a represents an integer of 1 to 3.)

Here, the substituted or unsubstituted monovalent hydrocarbon group as represented by $R^1$ in the general formula (2) has about 1 to 20 carbon atoms, preferably about 1 to 10 carbon atoms, and more preferably about 1 to 8 carbon atoms. Such monovalent hydrocarbon groups as represented by $R^1$ may be identical to or different from one another. Specific examples of such monovalent hydrocarbon group include alkyl groups such as a methyl group, an ethyl group, an n-propyl group, an isopropyl group, an n-butyl group, an isobutyl group, a test-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; cycloalkyl groups such as a cyclopentyl group and a cyclohexyl group; alkenyl groups such as a vinyl group, an allyl group, a propenyl group, an isopropenyl group, a butenyl group, a pentenyl group and a hexenyl group; aryl groups such as a phenyl group, a tolyl group, a xylyl group and an α-, β-naphthyl group; aralkyl groups such as a benzyl group, a 2-phenylethyl group and a 3-phenylpropyl group; or groups obtained by substituting a part of or all the hydrogen atoms in any of the abovementioned groups with, for example, cyano groups and/or halogen atoms such as F, Cl and Br, examples of such substituted groups including a 3-chloropropyl group, a 3,3,3-trifluoropropyl group and a 2-cyanoethyl group. Among the aforementioned groups, preferred are a methyl group, an ethyl group and a phenyl group; particularly preferred are a methyl group and a phenyl group in terms of availability, productivity and cost. Further, in the general formula (2), it is preferred that the two $R^1$s individually bonded to the two carbon atoms as part of the carbon-carbon double bond (ethenylene group) through which the silicon atoms in the two hydrolyzable silyl groups are bonded to each other be hydrogen atoms.

The substituted or unsubstituted alkyl group as represented by $R^2$ has about 1 to 20 carbon atoms, preferably about 1 to 6 carbon atoms, and more preferably about 1 to 4 carbon atoms. Specific examples of such alkyl group include a methyl group, an ethyl group, an n-propyl group, an isopropyl group, an n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group. The substituted or unsubstituted cycloalkyl group as represented by $R^2$ has about 3 to 20 carbon atoms, preferably about 4 to 8 carbon atoms, and more preferably about 5 to 6 carbon atoms. Examples of such cycloalkyl group include a cyclopentyl group and a cyclohexyl group. Further, there may also be employed groups obtained by substituting a part of or all the hydrogen atoms in any of these alkyl groups and cycloalkyl groups with, for example, cyano groups, halogen atoms such as F, Cl and Br or lower alkoxy groups having about 1 to 4 carbon atoms. Examples of such substituted groups include halogen-substituted alkyl groups such as a 3-chloropropyl group and a 3,3,3-trifluoropropyl group; and alkoxy-substituted alkyl groups such as a 2-cyanoethyl group, a methoxymethyl group, a methoxyethyl group, an ethoxymethyl group and an ethoxyethyl group. Among the above examples of $R^2$, preferred are a methyl group, an ethyl group and a methoxyethyl group, and particularly preferred is a methyl group, in terms of hydrolyzability or the like.

The hydrolyzable organic silicon compound as the component (B) that is represented by the general formula (2), is mainly used as a curing agent (cross-linking agent). In the general formula (2), each a independently represents an integer of 1 to 3, and it is preferred that a be 2 or 3 in terms of curability. Particularly, since a hydrolyzable organic silicon compound having three alkoxy groups such as methoxy groups on an identical silicon atom in one molecule (i.e. a total of six such alkoxy groups in the molecule) possesses two trifunctional alkoxysilane moieties in one molecule, such compound is useful as a curing agent (cross-linking agent) for a dealcoholized silicone RTV (room temperature-curable organopolysiloxane composition). A synthesis example of the component (B) is described below.

<Production of Silicon-Containing Compound as Component (B)>

The hydrolyzable organic silicon compound as the component (B), such as the bissilyl-type organosilane having two hydrolyzable silyl groups in its molecule and the structure where the two silicon atoms in such hydrolyzable silyl groups are bonded to each other through the carbon-carbon double bond (ethenylene group) can, for example, be easily produced through an olefin redistribution reaction which is an olefin metathesis reaction of an alkoxysilane having a carbon-carbon double bond such as a vinyl group on a silicon atom. This reaction can, for example, be expressed by the following reaction formula.

[Chemical formula 6]

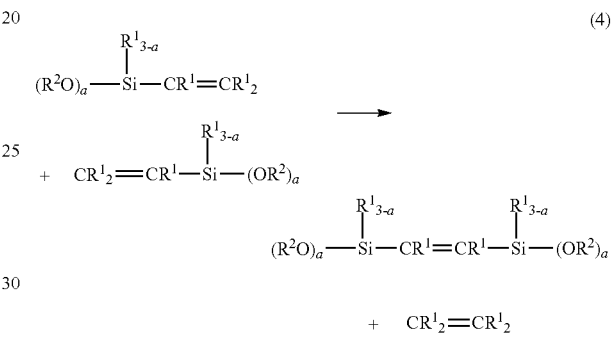

(In the formula (4), $R^1$, $R^2$ and a are defined as above in the general formula (2).)

Any catalyst that is appropriate may be employed as an olefin metathesis catalyst used to perform olefin redistribution via metathesis reaction. Examples of such metathesis catalyst include a ruthenium carbene complex or osmium carbene complex having 16 electrons and a five-coordinate metal center as that shown in the following general (5), in an oxidation state of +2 in form.

[Chemical formula 7]

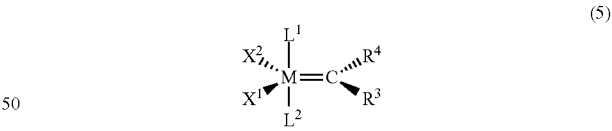

In the formula (5), M represents ruthenium or osmium; $X^1$, $X^2$ represent any anionic ligands, and may be either identical to or different from each other; and $L^1$, $L^2$ represent any neutral electron-donating ligands, and may be either identical to or different from each other.

Further, in the formula (5), each of $R^3$ and $R^4$ represents a hydrogen atom; or a group that may have a substituent group(s), such group being selected from an alkyl group and has 1 to 20 carbon atoms, an alkenyl group having 2 to 20 carbon atoms, an alkynyl group having 2 to 20 carbon atoms, an aryl group, a carboxylate group having 2 to 20 carbon atoms, an alkoxy group having 1 to 20 carbon atoms, an alkenyloxy group having 2 to 20 carbon atoms, an alkynyloxy group having 2 to 20 carbon atoms, an aryloxy group, an alkoxycarbonyl group having 2 to 20 carbon atoms, an alkylthio group having 1 to 20 carbon atoms, an alkylsulfonyl group having 1 to 20 carbon atoms and an alkylsulfinyl group having 1 to 20 carbon atoms.

The substituent group(s) that may be contained in the group represented by $R^3$ or $R^4$, include at least one substituent group selected from an alkyl group having 1 to 10 carbon atoms, an alkoxy group having 1 to 10 carbon atoms and an aryl group. Also, any of these substituent groups may be substituted by at least one of a halogen atom(s), an alkyl group having 1 to 5 carbon atoms, an alkoxy group having 1 to 5 carbon atoms and a phenyl group.

In addition, each catalyst ligand may further have one or more functional groups. Appropriate examples of such functional groups include, but are not limited to a hydroxyl group, thiol, thioether, ketone, aldehyde, ester, ether, amine, imine, amide, nitro, carboxylic acid, disulfide, carbonate, isocyanate, carbodiimide, carboalkoxy, carbamate and halogen.

A preferable embodiment of these catalysts is that $R^3$ represents a hydrogen atom, and $R^4$ comprises a group(s) selected from an alkyl group having 1 to 20 carbon atoms, an alkenyl group having 2 to 20 carbon atoms and an aryl group. A more preferable embodiment is that $R^4$ comprises a phenyl group or vinyl group that has been arbitrarily substituted by at least one group selected from an alkyl group having 1 to 5 carbon atoms, an alkoxy group having 1 to 5 carbon atoms, a phenyl group and a functional group. A particularly preferable embodiment is that $R^4$ comprises a phenyl group or vinyl group that has been substituted by at least one of a chlorine atom, a bromine atom, an iodine atom, a fluorine atom, a nitro group, an amino group, a methyl group, a methoxy group and a phenyl group. The most preferable embodiment is that $R^4$ comprises a phenyl group.

A preferable embodiment of these catalysts is that $L^1$ and $L^2$ may be either identical to or different form each other, and are selected from phosphine, sulfonated phosphine, phosphite, phosphinite, phosphonite, arsine, stibine, ether, amine, amide, imine, sulfoxide, carboxyl, nitrosyl, pyridine and thioether. A more preferable embodiment is that each of $L^1$ and $L^2$ represents phosphine expressed by a structural formula $PR^6R^7R^8$. In this formula, each of $R^6$, $R^7$ and $R^8$ independently represents an aryl group or an alkyl group having 1 to 10 carbon atoms; especially a primary alkyl group, a secondary alkyl group or a cycloalkyl group. The most preferable embodiment is that each of the ligands $L^1$ and $L^2$ is selected from —P(cyclohexyl)$_3$, —P(cyclopentyl)$_3$, —P(isopropyl)$_3$ and —P(phenyl)$_3$.

Another preferable embodiment of these catalysts is that $L^1$ represents any neutral electron donor, and $L^2$ represents an imidazolidine ligand. In a particular embodiment, $L^2$ is represented by the following structural formula (6).

[Chemical formula 8]

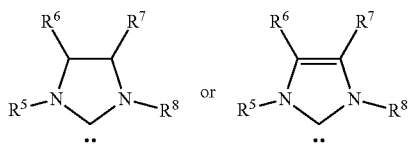

(6)

In the above formula (6), each of $R^5$, $R^6$, $R^7$ and $R^8$ independently represents a hydrogen atom; or a group that may have a substituent group(s), such group being selected from an alkyl group having 1 to 20 carbon atoms, an alkenyl group having 2 to 20 carbon atoms, an alkynyl group having 2 to 20 carbon atoms, an aryl group, a carboxylate group having 2 to 20 carbon atoms, an alkoxy group having 1 to 20 carbon atoms, an alkenyloxy group having 2 to 20 carbon atoms, an alkynyloxy group having 2 to 20 carbon atoms, an aryloxy group, an alkoxycarbonyl group having 2 to 20 carbon atoms, an alkylthio group having 1 to 20 carbon atoms, an alkylsulfonyl group having 1 to 20 carbon atoms and an alkylsulfinyl group having 1 to 20 carbon atoms. Both $R^6$ and $R^7$ may be either unsubstituted; or substituted by a cycloalkyl moiety or an aryl moiety. Further, both $L^1$ and $L^2$ may be bidentate ligands.

A preferable embodiment of these catalysts is that each of $X^1$ and $X^2$ independently represents a hydrogen atom, a halogen atom; or a group selected from an alkyl group having 1 to 20 carbon atoms, an aryl group, an alkoxide group having 1 to 20 carbon atoms, an aryloxide group, an alkyldiketonate group having 3 to 20 carbon atoms, an aryldiketonate group, a carboxylate group having 1 to 20 carbon atoms, an arylsulfonate group, an alkylsulfonate group having 1 to 20 carbon atoms, an alkylthio group having 1 to 20 carbon atoms, an alkylsulfonyl group having 1 to 20 carbon atoms and an alkylsulfinyl group having 1 to 20 carbon atoms. Further, each of $X^1$ and $X^2$ may arbitrarily comprise at least one group selected from an alkyl group having 1 to 10 carbon atoms, an alkoxy group having 1 to 10 carbon atoms and an aryl group that have been each further substituted by at least one atom or group selected from a halogen atom, an alkyl group having 1 to 5 carbon atoms, an alkoxy group having 1 to 5 carbon atoms and an phenyl group. A more preferable embodiment is that each of $X^1$ and $X^2$ represents a halogen atom, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate or trifluoromethanesulfonate. (Here, Me, Et and Ph represent methyl group, ethyl group and phenyl group, respectively.) The most preferable embodiment is that each of $X^1$ and $X^2$ represents a chlorine atom. Also, both $X^1$ and $X^2$ may be bidentate ligands.

Specific examples of the hydrolyzable organic silicon compound represented by the general formula (2) in which the silicon atoms are bonded together through the vinylene group (ethenylene group), include those expressed by the following structural formulae. Any one of the following compounds may be used singularly, or two or more of them may be used in combination.

[Chemical formula 9]

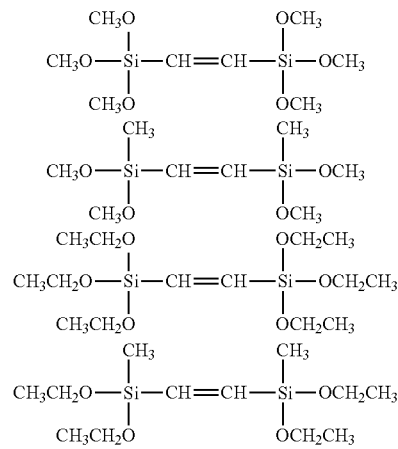

-continued

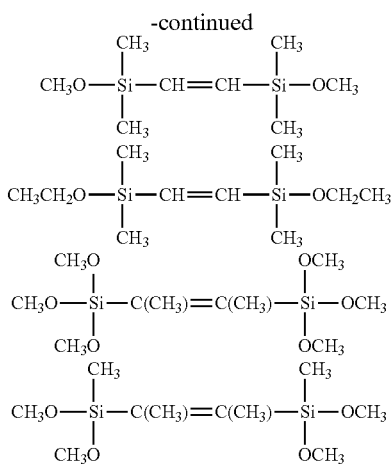

The hydrolyzable organic silicon compound as the component (B) is used in an amount of 0.1 to 30 parts by mass, preferably 3 to 20 parts by mass, per 100 parts by mass of the organopolysiloxane as the component (A). When such amount is smaller than 0.1 parts by mass, there cannot be achieved a sufficient cross-linking effect, thus making it impossible to obtain a composition having a target fast curability. When such amount of the component (B) used is greater than 30 parts by mass, a mechanical property as a rubber property exhibited will be impaired, which may then lead to an economically disadvantaged status.
—Component (C)—

A curing catalyst as a component (C) is used to promote a hydrolytic condensation reaction between the composition of the invention and water in the air, and is generally referred to as a curing catalyst. As the component (C), there may be employed a known catalyst normally used in a room temperature-curable silicone resin composition capable of curing under the presence of moisture.

Examples of the curing catalyst as the component (C) include, but are not limited to a phosphazene-containing compound such as N,N,N',N',N",N"-hexamethyl-N'''-(trimethylsilylmethyl)-phosphorimidictriamide; aminoalkyl group-substituted alkoxysilanes such as 3-aminopropyltriethoxysilane and N-β (aminoethyl) γ-aminopropyltrimethoxysilane; amine compounds such as hexylamine and dodecylamine phosphate, and salts of these amine compounds; a quaternary ammonium salt such as benzyltriethylammonium acetate; dialkylhydroxylamines such as dimethylhydroxylamine and diethylhydroxylamine; and guanidyl group-containing silanes and siloxanes such as tetramethylguanidylpropyltrimethoxysilane, tetramethylguanidylpropylmethyldimethoxysilane and tetramethylguanidylpropyltris (trimethylsiloxy) silane. Here, only one kind or two or more kinds of these catalysts may be used as the component (C).

These catalysts may simply be used in a so-called catalytic amount. It is preferred that the component (C) be added in an amount of 0.001 to 20 parts by mass, more preferably 0.005 to 10 parts by mass, and even more preferably 0.01 to 5 parts by mass, per 100 parts by mass of the organopolysiloxane as the component (A). When the component (C) is in an amount of smaller than 0.001 parts by mass, there cannot be achieved a favorable curability, and the curing speed will thus become slow, which constitutes a failure. In contrast, when the component (C) is in an amount of greater than 20 parts by mass, the composition will cure at an extremely fast speed, which may then lead to a shorter work time after applying the composition and/or cause the mechanical property of the rubber obtained to be impaired.

The following compositions may also be added to the composition of the invention, if necessary.
—Component (D)—

A component (D) is any cross-linking agent component that may be added as necessary. Particularly, the component (D) comprises a hydrolyzable organosilane and/or a partial hydrolysis condensate thereof, other than the components (A) and (B). Specific examples of the component (D) include ethylsilicate, propylsilicate, methyltrimethoxysilane, methyltriethoxysilane, vinyltrimethoxysilane, vinyltriethoxysilane, methyltris (methoxyethoxy) silane, vinyltris (methoxyethoxy) silane, methyltripropenoxysilane, vinyltripropenoxysilane, phenyltripropenoxysilane; and partial hydrolysis condensates of these agents. Any one of these agents may be used singularly, or two or more of them may be used in combination.

The component (D) is normally added in an amount of 0 to 30 parts by mass, preferably 0.1 to 20 parts by mass, more preferably 0.5 to 15 parts by mass, per 100 parts by mass of the component (A). When the component (D) is in an amount of greater than 30 parts by mass, there may occur problems that the cured product will become excessively hard, and that an economically disadvantaged status will be reached. —Component (E)—

A component (E) is a filler (inorganic filler and/or organic resin filler), and is an optional component that may be added as necessary. The component (E) servers to impart a sufficient mechanical strength to the cured product formed from the composition of the invention. A known filler(s) can be used as the filler of the component (E), and examples thereof include a finely powdered silica; a fumed silica; a precipitated silica; a reinforced silica-based filler such as a silica obtained by hydrophobizing the surface of any of these silicas with an organic silicon compound; glass beads; glass balloons; transparent resin beads; a silica aerogel; a diatom earth; metal oxides such as ferric oxide, zinc oxide, titanium oxide and a fumed metal oxide; wet silicas or wet silicas whose surfaces have been treated with silanes; reinforcing materials such as a quartz powder (crystalline silica fine powder), carbon black, talc, zeolite and bentonite; asbestos; glass fibers; carbon fibers; metal carbonates such as calcium carbonate, magnesium carbonate and zinc carbonate; asbestos; a glass wool; finely powdered mica; a molten silica powder; and synthetic resin powders such as polystyrene powder, polyvinyl chloride powder and polypropylene powder. Among these fillers, inorganic fillers such as silica, calcium carbonate and zeolite are preferred. Particularly preferred are a surface-hydrophobized fumed silica, and calcium carbonate.

It is preferred that the component (E) be added in an amount of 0 to 1,000 parts by mass per 100 parts by mass of the component (A). When the component (E) is in a large amount of greater than 1,000 parts by mass, not only the workability will be impaired due to an increased viscosity of the composition, but it will also be difficult to achieve a rubber elasticity due to a decreased rubber strength exhibited after curing. —Component (F)—

A component (F) is an adhesion promoter, and is an optional component that may be added as necessary. The component (F) serves to impart a sufficient adhesiveness to the cured product formed from the composition of the invention. A known adhesion promoter (a silane coupling agent such as a functional group-containing hydrolyzable silane) can be favorably used as the component (F). Examples of such known adhesion promoter include a vinylsilane coupling agent, a (meth)acrylsilane coupling agent, an epoxysilane coupling agent, an aminosilane coupling agent and a mercaptosilane coupling agent. Specific examples thereof include vinyltris (β-methoxyethoxy) silane, γ-methacryloxypropyltrimethoxysilane, β-(3,4-epoxycyclohexyl) ethyltrimethoxysilane, γ-glycidoxypropyltrimethoxysilane, γ-glycidoxypropylmethyldiethoxysilane, N-β-(aminoethyl) γ-aminopropyltrimethoxysilane, γ-aminopropyltriethoxysilane, 3-2-(aminoethylamino) propyltrimethoxysilane, γ-mercaptopropyltrimethoxysilane and isocyanate silane.

Among these specific examples, particularly preferred are aminosilanes such as γ-aminopropyltriethoxysilane and 3-2-(aminoethylamino) propyltrimethoxysilane; γ-glycidoxypropyltrimethoxysilane; epoxysilanes such as β-(3,4-epoxycyclohexyl) ethyltrimethoxysilane; and isocyanate silane.

The component (F) is added in an amount of 0 to 30 parts by mass, particularly preferably 0.1 to 20 parts by mass, per 100 parts by mass of the component (A). The component (F) does not have to be used, if adhesion can take place without an adhesion promoter due to the characteristics of the filler and an adherend. —Component (G)—

An organopolysiloxane as a component (G) is an optional component that may be added as necessary, and is represented by the following general formula (3). Particularly, the organopolysiloxane as the component (G) is a linear diorganopolysiloxane not containing a functional group(s) in its molecule that are associated with condensation reaction (i.e. so-called non-functional silicone oil).

[Chemical formula 10]

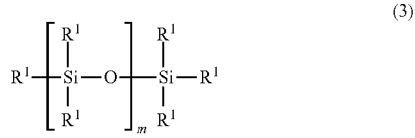

(3)

(In the general formula (3), $R^1$ represents a hydrogen atom, or a substituted or unsubstituted monovalent hydrocarbon group having 1 to 20 carbon atoms. The multiple $R^1$s may be either identical to or different from one another. m represents an integer of 1 to 2,000.)

In the above formula (3), the substituted or unsubstituted hydrocarbon group as represented by $R^1$ has 1 to 20 carbon atoms, preferably 1 to 10 carbon atoms, more preferably 1 to 8 carbon atoms. Such hydrocarbon groups as represented by may be identical to or different from one another. Examples of such hydrocarbon group include alkyl groups such as a methyl group, an ethyl group, an n-propyl group, an isopropyl group, an n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; cycloalkyl groups such as a cyclopentyl group and a cyclohexyl group; alkenyl groups such as a vinyl group, an allyl group, a propenyl group, an isopropenyl group, a butenyl group, a pentenyl group and a hexenyl group; aryl groups such as a phenyl group, a tolyl group, a xylyl group and an α-, β-naphthyl group; aralkyl groups such as a benzyl group, a 2-phenylethyl group and a 3-phenylpropyl group; or groups obtained by substituting a part of or all the hydrogen atoms in any of the abovementioned groups with, for example, cyano groups and/or halogen atoms such as F, Cl and Br, examples of such substituted groups including a 3-chloropropyl group, a 3,3,3-trifluoropropyl group and a 2-cyanoethyl group. Among the aforementioned groups, preferred are a methyl group and an ethyl group; particularly preferred is a methyl group in terms of availability, productivity and cost.

Further, it is preferred that the organopolysiloxane as the component (G) exhibit a viscosity of about 0.65 to 1,000,000 mPa·s, more preferably about 30 to 500,000 mPa·s, even more preferably about 50 to 100,000 mPa·s, particularly preferably about 100 to 80,000 mPa·s, and most preferably about 200 to 50,000 mPa·s, at a temperature of 25° C. It is preferable when the viscosity of this organopolysiloxane is not lower than 10 mPa·s, and not higher than 1,000,000 mPa·s. Because when the viscosity is not lower than 10 mPa·s, there can be easily obtained a coating film having superior physical and mechanical strengths. And, when the viscosity is not higher than 1,000,000 mPa·s, the viscosity of the composition will not become extremely high such that a favorable workability can be achieved at the time of use. Here, the viscosity is a numerical value measured by a rotary viscometer.

In the above formula (3), m represents an integer of 1 to 2,000; and for the similar reasons, it is desired that m normally be an integer of about 10 to 1,500, preferably about 30 to 1,200, more preferably about 50 to 1,000, and even more preferably about 100 to 800.

It is preferred that the component (G) be added in an amount of 0 to 100 parts by mass, more preferably 5 to 70 parts by mass, and even more preferably 10 to 60 parts by mass, per 100 parts by mass of the component (A). However, the component (G) does not have to be added, when the composition has a low viscosity such that a sufficient workability has already been achieved. When the component (G) is in an amount of greater than 100 parts by mass, rubber properties may be impaired.

—Other Components—

Further, there may be added to the room temperature-curable organopolysiloxane composition of the invention known additives such as a pigment; a dye; an anti-aging agent; an antioxidant; an antistatic agent; and a flame retardant including antimony oxide, chlorinated paraffin or the like. Furthermore, there may be added to the composition of the invention polyether as a thixotropy improver, a fungicide and/or an antibacterial agent. Furthermore, there may also be added to the composition of the invention a metal-containing curing catalyst for the purpose of improving curability.

Examples of such metal-containing curing catalyst as one of the other components include, but are not limited to alkyl tin ester compounds such as dibutyltin diacetate, dibutyltin dilaurate and dibutyltin dioctoate; titanate esters or titanium chelate compounds, such as tetraisopropoxy titanium, tetra n-butoxy titanium, tetrakis (2-ethylhexoxy) titanium, dipropoxybis (acetylacetonato) titanium and titanium isopropoxyoctylene glycol; zinc naphthenate; zinc stearate; zinc-2-ethyloctoate; iron-2-ethylhexoate; cobalt-2-ethylhexoate; manganese-2-ethylhexoate; cobalt naphthenate; aluminum alcoholate compounds such as aluminum isopropylate and aluminum secondary butylate; aluminum chelate compounds such as aluminum alkyl acetate•diisopropylate and aluminum bisethylacetoacetate•monoacetylacetonate; organic metal compounds such as bismuth neodecanoate (III), bismuth 2-ethylhexanoate (III), bismuth citrate (III) and bismuth octylate; and lower fatty acid salts of alkali metals, such as potassium acetate, sodium acetate and lithium oxalate. Further, any one of these curing catalysts as the other components may be used singularly, or two or more of them may be used in a mixed manner.

Moreover, the room temperature-curable organopolysiloxane composition of the invention can be obtained by homogenously mixing given amounts of all the above components and given amounts of the abovementioned various additives, under a dry atmosphere.

Further, although the above room temperature-curable organopolysiloxane composition cures when left under room temperature, the composition may be molded or cured through known methods and conditions depending on the type thereof.

The room temperature-curable organopolysiloxane composition of the invention thus obtained is capable of being rapidly cured at room temperature due to the moisture in the air, thereby forming a rubbery elastic cured product superior in heat resistance, weather resistance, low-temperature characteristics and adhesiveness to various base materials, especially metals. Further, the composition of the invention is particularly superior in storage stability and curability. For example, even after being stored for six months, the composition of the invention can be rapidly cured when exposed to the air, and then form a cured product having the abovementioned excellent properties. Furthermore, a toxic or corrosive gas will not be emitted at the time of curing, and a surface to which this composition has been applied will not rust. Furthermore, since this composition will not cause contact faults between electric and electronic parts, the composition is not only useful as an insulating material and/or an adhesive agent for electric and electronic parts, but can also be widely used as a sealing agent, a coating agent, a covering agent or a mold release agent to various base materials; or as a fiber treatment agent. In addition, various molded products can be obtained by curing and molding this composition, and these molded products are superior in, for example, heat resistance and weather resistance.

Working Example

The present invention is described in detail hereunder with reference to synthesis examples, working examples and comparative examples. However, the present invention is not limited to the following working examples. Here, in the specific examples below, "part" refers to "part by mass," and viscosity refers to a value measured by a rotary viscometer at 25° C.

Synthesis Example

Following is a method for synthesizing the hydrolyzable organic silicon compound as the component (B) having the carbon-carbon double bond between the two silicon atoms.

Synthesis Example 1

<Synthesis of Hydrolyzable Organic Silicon Compound with Two Trialkoxysilyl Groups being Bonded to Each Other Through Ethenylene Group-[bis (trimethoxysilyl) ethylene]>

Under an argon atmosphere and a temperature of 25° C., 50 g of vinyltrimethoxysilane (0.337 mol) and 0.2 g of the second-generation Grubbs catalyst (0.235 mmol) were stirred together in toluene at 120° C. for eight hours. After a reaction was completed, a reaction solution was then analyzed through gas chromatography, and it was confirmed that 1,2-bis (trimethoxysilyl) ethylene had been obtained at an yield of 85%. This reaction is shown in the following formula (7).

[Chemical formula 11]

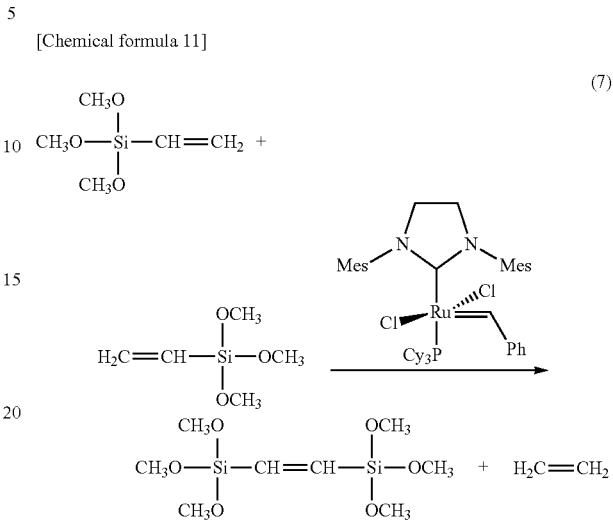

Synthesis Example 2

A reaction and operation similar to those of the synthesis example 1 were performed, except that vinyltriethoxysilane was used instead of vinyltrimethoxysilane. As a result, 1,2-bis (triethoxysilyl) ethylene was obtained at an yield of 85%.

Synthesis Example 3

A reaction and operation similar to those of the synthesis example 1 were performed, except that 1-methylethenyltrimethoxysilane was used instead of vinyltrimethoxysilane. As a result, 2,3-bis (trimethoxysilyl)-2-butene was obtained.

Working Example 1

A composition was prepared by mixing 100 parts of a dimethylpolysiloxane that has a viscosity of 5,000 mPa·s and both terminals of its molecular chain blocked by a hydroxyl group (silanol group), 3.7 parts of the bis (trimethoxysilyl) ethylene obtained in synthesis example 1 and 0.68 parts of tetramethylguanidylpropyltrimethoxysilane under a moisture-blocked environment until a uniform level had been reached.

Working Example 2

A composition was prepared in a similar manner as the working example 1, except that 4.9 parts of the bis (triethoxysilyl) ethylene obtained in the synthesis example 2 were used instead of bis (trimethoxysilyl) ethylene.

Working Example 3

A composition was prepared by mixing 100 parts of a dimethylpolysiloxane that has a viscosity of 20,000 mPa·s and both terminals of its molecular chain blocked by a hydroxyl group (silanol group), 10 parts of a surface-hydrophobized fumed silica, 2.86 parts of the bis (trimethoxysilyl) ethylene obtained in the synthesis example 1, 0.53 parts of tetramethylguanidylpropyltrimethoxysilane, 0.80 parts of 3-aminopropyltriethoxysilane and 0.80 parts of 3-(2-aminoethylamino) propyltrimethoxysilane under a moisture-blocked environment until a uniform level had been reached.

Working Example 4

A composition was prepared in a similar manner as the working example 3, except that 3.75 parts of the bis (triethoxysilyl) ethylene obtained in the synthesis example 2 were used instead of bis (trimethoxysilyl) ethylene.

Working Example 5

A composition was prepared in a similar manner as the working example 3, except that the 2,3-bis (trimethoxysilyl)-2-butene obtained in the synthesis example 3 was used instead of bis (trimethoxysilyl) ethylene.

Comparative Example 1

A composition was prepared in a similar manner as the working example 1, except that 3.7 parts of bis (trimethoxysilyl) ethane [following structural formula (8)] were used instead of bis (trimethoxysilyl) ethylene.

[Chemical formula 12]

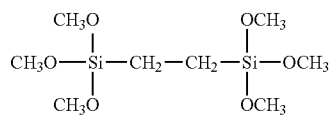

(8)

Comparative Example 2

A composition was prepared in a similar manner as the working example 1, except that 4.9 parts of bis (triethoxysilyl) ethane [following structural formula (9)] were used instead of bis (trimethoxysilyl) ethylene.

[Chemical formula 13]

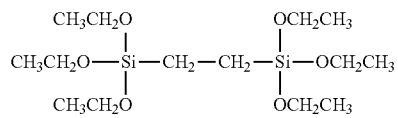

(9)

Comparative Example 3

A composition was prepared in a similar manner as the working example 3, except that 2.86 parts of bis (trimethoxysilyl) ethane [following structural formula (8)] were used instead of bis (trimethoxysilyl) ethylene.

[Chemical formula 14]

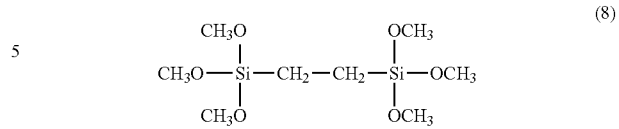

(8)

Comparative Example 4

A composition was prepared in a similar manner as the working example 3, except that 3.75 parts of bis (triethoxysilyl) ethane [following structural formula (9)] were used instead of bis (trimethoxysilyl) ethylene.

[Chemical formula 15]

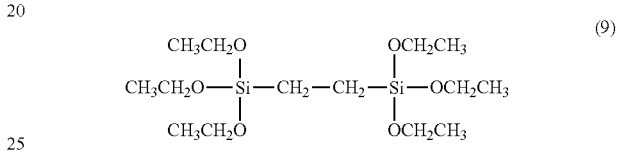

(9)

Test Method

A tack-free time of each of the compositions prepared in the working examples 1 to 5; and comparative examples 1 to 4, was measured.

A glass petri dish having an inner diameter of 10 mm was then loaded with each of the compositions prepared in the working examples 1 to 5; and the comparative examples 1 to 4, followed by leaving the glass petri dish at 23° C., 50% RH for a day, and then measuring the thickness of a portion of the composition that had been cured from its surface that had been exposed to the air, thus completing an evaluation of a curability at depth.

Further, each of the compositions prepared in the working examples 1 to 5; and the comparative examples 1 to 4 was pushed out as a sheet-shaped specimen having a thickness of 2 mm, immediately after the composition had been prepared. This specimen was then exposed to an air of 23° C., 50% RH, and further left in the same atmosphere for seven days so as to obtain a cured product. The properties (initial properties) of such cured product were measured in accordance with JIS K-6249. Here, the hardness of the cured product was measured by a durometer A-type hardness meter manufactured in accordance with JIS K-6249.

Further, similar measurements were performed on a product obtained by storing the above cured product in a thermo-hygrostat of 85° C., 85% RH for seven days. Furthermore, similar measurements were also performed on a product obtained by heating the above cured product in an oven of 150° C. for seven days.

A shear (shearing) adhesion specimen having an adhesion area of 2.5 mm² and an adhesion thickness of 1 mm was prepared using each of the compositions prepared in the working examples 3 to 5 and the comparative examples 3 and 4; and an aluminum or glass adherend having a width of 25 mm and a length of 100 mm. This shear adhesion specimen was cured at 23° C., 50% RH for three or seven days, followed by measuring a shear adhesion force thereof.

The results of the working examples 1 to 5; and the comparative examples 1 to 4 are shown in the following tables.

TABLE 1

| Measurement result | | Working example 1 | Comparative example 1 |
|---|---|---|---|
| Tack-free time (min) | | 5 | 60< |
| Curability at depth (mm/day) | | 3.15 | 3.10 |
| Initial RTV 7 days | Hardness (Durometer A) | 21 | 22 |
| | Elongation (%) | 105 | 105 |
| | Tensile strength (MPa) | 0.40 | 0.39 |
| Moisture resistance 85° C./85% RH 7 days | Hardness (Durometer A) | 8 | 7 |
| | Elongation (%) | 165 | 172 |
| | Tensile strength (MPa) | 0.18 | 0.24 |
| Heat resistance 150° C. 7 days | Hardness (Durometer A) | 17 | 18 |
| | Elongation (%) | 175 | 190 |
| | Tensile strength (MPa) | 0.45 | 0.32 |

TABLE 2

| Measurement result | | Working example 2 | Comparative example 2 |
|---|---|---|---|
| Tack-free time (min) | | 15 | 60< |
| Curability at depth (mm/day) | | 3.12 | 2.86 |
| Initial RTV 7 days | Hardness (Durometer A) | 23 | 22 |
| | Elongation (%) | 90 | 90 |
| | Tensile strength (MPa) | 0.39 | 0.34 |
| Moisture resistance 85° C./85% RH 7 days | Hardness (Durometer A) | 8 | 7 |
| | Elongation (%) | 155 | 160 |
| | Tensile strength (MPa) | 0.19 | 0.20 |
| Heat resistance 150° C. 7 days | Hardness (Durometer A) | 16 | 17 |
| | Elongation (%) | 110 | 85 |
| | Tensile strength (MPa) | 0.31 | 0.32 |

TABLE 3

| Measurement result | | Working example 3 | Working example 5 | Comparative example 5 |
|---|---|---|---|---|
| Tack-free time (min) | | 3 | 3 | 30< |
| Curability at depth (mm/day) | | 3.25 | 3.15 | 3.10 |
| Initial RTV 7 days | Hardness (Durometer A) | 24 | 23 | 12 |
| | Elongation (%) | 195 | 185 | 95 |
| | Tensile strength (MPa) | 0.87 | 0.86 | 0.18 |
| Moisture resistance 85° C./85% RH 7 days | Hardness (Durometer A) | 6 | 7 | 1 |
| | Elongation (%) | 260 | 255 | 250 |
| | Tensile strength (MPa) | 0.55 | 0.54 | 0.13 |
| Heat resistance 150° C. 7 days | Hardness (Durometer A) | 17 | 17 | 11 |
| | Elongation (%) | 220 | 210 | 145 |
| | Tensile strength (MPa) | 0.80 | 0.80 | 0.24 |
| Shear adhesion force RTV 3 days | Glass/Glass (MPa) | 0.48 | 0.47 | 0.17 |
| | Aluminum/Aluminum (MPa) | 0.47 | 0.46 | 0.18 |
| Shear adhesion force RTV 7 days | Glass/Glass (MPa) | 0.50 | 0.51 | 0.30 |
| | Aluminum/Aluminum (MPa) | 0.51 | 0.50 | 0.34 |

TABLE 4

| Measurement result | | Working example 4 | Comparative example 4 |
|---|---|---|---|
| Tack-free time (min) | | 10 | 120< |
| Curability at depth (mm/day) | | 3.62 | 3.52 |
| Initial RTV 7 days | Hardness (Durometer A) | 20 | 11 |
| | Elongation (%) | 195 | 125 |
| | Tensile strength (MPa) | 0.72 | 0.28 |
| Moisture resistance 85° C./85% RH 7 days | Hardness (Durometer A) | 1 | 1 |
| | Elongation (%) | 335 | 200 |
| | Tensile strength (MPa) | 0.41 | 0.12 |
| Heat resistance 150° C. 7 days | Hardness (Durometer A) | 9 | 6 |
| | Elongation (%) | 300 | 330 |
| | Tensile strength (MPa) | 0.63 | 0.40 |
| Shear adhesion force RTV 3 days | Glass/Glass (MPa) | 0.51 | 0.18 |
| | Aluminum/Aluminum (MPa) | 0.45 | 0.16 |
| Shear adhesion force RTV 7 days | Glass/Glass (MPa) | 0.57 | 0.31 |
| | Aluminum/Aluminum (MPa) | 0.67 | 0.30 |

As described above, it is understood that the room temperature-curable organopolysiloxane composition of the invention is superior in fast curability, and is capable of forming a cured product superior in durability. The room temperature-curable organopolysiloxane composition of the invention employs the type of curing agent capable of being synthesized in one step using alkoxysilane as a highly versatile material. Thus, the composition of the invention can be produced in an industrially advantageous manner.

The present invention is not limited to the aforementioned embodiment. The aforementioned embodiment is simply an example, and any embodiment shall be included in the technical scope of the present invention provided that the embodiment has a structure substantially identical to the technical ideas described in the scope of the claims of the invention, and brings about similar functions and effects.

The invention claimed is:

1. A room temperature-curable organopolysiloxane composition comprising:

(A) 100 parts by mass of an organopolysiloxane represented by the following general formula (1)

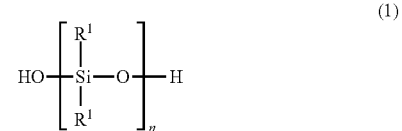

(1)

wherein $R^1$ represents either a hydrogen atom or a monovalent hydrocarbon group that has 1 to 20 carbon atoms and may have a substituent group(s), the multiple $R^1$s are identical to or different from one another, and n represents an integer of not smaller than 1;

(B) a hydrolyzable organic silicon compound and/or a partial hydrolysis condensate thereof that are or is in an amount of 0.1 to 30 parts by mass per 100 parts by mass of the component (A), and represented by the following general formula (2)

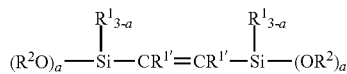
(2)

wherein $R^1$ represents a monovalent hydrocarbon group that has 1 to 20 carbon atoms and may have a substituent group(s), the multiple $R^1$s are identical to or different from one another, $R^{1'}$ represents a hydrogen atom or a methyl group, the two $R^{1'}$'s are identical to each other, $R^2$ represents either an alkyl group that has 1 to 20 carbon atoms and may have a substituent group(s) or a cycloalkyl group that has 3 to 20 carbon atoms, and a represents an integer of 1 to 3; and (C) a curing catalyst in an amount of 0.001 to 20 parts by mass per 100 parts by mass of the component (A).

2. The room temperature-curable organopolysiloxane composition according to claim 1, further comprising:

(D) a hydrolyzable organosilane and/or a partial hydrolysis condensate thereof other than the components (A) and (B), in an amount of 0 to 30 parts by mass per 100 parts by mass of the component (A);

(E) a filler in an amount of 0.1 to 1,000 parts by mass per 100 parts by mass of the component (A); and (F) an adhesion promoter in an amount of 0.001 to 30 parts by mass per 100 parts by mass of the component (A).

3. The room temperature-curable organopolysiloxane composition according to claim 2, further comprising:

(G) an organopolysiloxane that is in an amount of 0.01 to 100 parts by mass per 100 parts by mass of the component (A), and is represented by the following general formula (3)

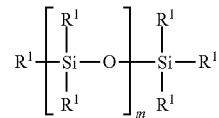
(3)

wherein $R^1$ represents either a hydrogen atom or a monovalent hydrocarbon group that has 1 to 20 carbon atoms and may have a substituent group(s), the multiple $R^1$s are identical to or different from one another, and m represents an integer of 1 to 2,000.

4. The room temperature-curable organopolysiloxane composition according to claim 1, further comprising:

(G) an organopolysiloxane that is in an amount of 0.01 to 100 parts by mass per 100 parts by mass of the component (A), and is represented by the following general formula (3)

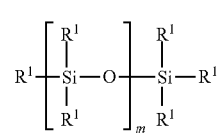
(3)

wherein $R^1$ represents either a hydrogen atom or a monovalent hydrocarbon group that has 1 to 20 carbon atoms and may have a substituent group(s), the multiple $R^1$s are identical to or different from one another, and m represents an integer of 1 to 2,000.

5. A sealing agent, coating agent or adhesive agent containing the room temperature-curable organopolysiloxane composition according to claim 1.

6. A molded product comprised of a cured product of the room temperature-curable organopolysiloxane composition according to claim 1.

* * * * *